(12) United States Patent
Tabata

(10) Patent No.: US 7,510,383 B2
(45) Date of Patent: Mar. 31, 2009

(54) DEVICE FOR FORMING FOAMED PRODUCT INTEGRAL WITH TRIM COVER ASSEMBLY

(75) Inventor: Tsuyoshi Tabata, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 99 days.

(21) Appl. No.: 11/603,894

(22) Filed: Nov. 24, 2006

(65) Prior Publication Data
US 2008/0125501 A1 May 29, 2008

(51) Int. Cl.
*B29C 44/34* (2006.01)
(52) U.S. Cl. .................. 425/4 R; 425/116; 425/442; 249/91; 249/95; 249/97; 249/170
(58) Field of Classification Search .......... 425/4 R, 425/116, 442; 249/91, 95, 97, 170; 264/46.7, 264/46.6
See application file for complete search history.

(56) References Cited

U.S. PATENT DOCUMENTS 5,132,064 A * 7/1992 Iwasawa et al. ............ 264/46.7
5,855,831 A * 1/1999 Takei ........................ 264/46.6

FOREIGN PATENT DOCUMENTS

JP 09-011252 1/1997

* cited by examiner

*Primary Examiner*—Yogendra Gupta
*Assistant Examiner*—Maria Veronica D Ewald
(74) *Attorney, Agent, or Firm*—Browdy and Neimark, P.L.L.C.

(57) ABSTRACT

A foaming die device is provided, which has a closure element rotatably provided therein. The foaming die device allows a three-dimensional trim cover assembly with an opening defined therein to be placed therein and also allows a liquid foaming agent to be injected into an inside of so placed trim cover assembly for foaming operation. In operation, when the trim cover assembly is placed in foaming die device prior to the foaming operation, the closure element is able to be rotated toward and easily inserted in the opening to prevent leakage of the liquid foaming agent therethrough, whereas, when the trim cover assembly is taken out from the foaming die device subsequent to the foaming operation, the closure element is able to be rotated and easily removed from that opening.

3 Claims, 4 Drawing Sheets

DEVICE FOR FORMING FOAMED PRODUCT INTEGRAL WITH TRIM COVER ASSEMBLY

BACKGROUND OF THE INVENTION

1. Field of the Invention

The present invention relates to a device for forming a foamed product integral with trim cover assembly. In particular, the invention is directed to a foaming die device of the type which allows a three-dimensional trim cover assembly to be placed therein and allows a liquid foaming agent to be injected into the inside of such trim cover assembly, so that a foam padding is created by curing the liquid foaming agent and filed in the trim cover assembly, thereby forming a foamed product integral with the trim cover assembly, such as a headrest or armrest for instance.

2. Description of Prior Art

In general, a vehicle or automobile is provided with a cushiony support element for resiliently supporting a body or some body portions of seat occupant or passenger in a comfortable way, which includes a seat, a headrest, an armrest and so forth. Such cushiony support element is basically formed by a foam padding and a three-dimensional trim cover assembly covering the foam padding. Typically, to form that cushiony support element, there has been known a foaming process for forming a foamed product integral with trim cover assembly, which consists of the steps of: providing a three-dimensional trim cover assembly preformed in a predetermined shape (which conforms to an outer shape of headrest or armrest, for example); placing the trim cover assembly together with required frame element(s) in a given foaming die device; thereafter injecting a liquid foaming agent into an inside of the trim cover assembly; and curing the liquid foaming agent so as to create and fill a foam padding in the trim cover assembly, whereby a foamed product integral with trim cover assembly is produced, which has frame element(s) integrally provided therein (i.e. a resultant headrest with stays or a resultant armrest with frames, for example)

Let us now for example assume that a headrest with stay will be formed in the above-described process. First of all, prior to the foaming operation, a three-dimensional trim cover assembly is preformed by sewing together separate cover materials in a predetermined shape conforming to a headrest. In most cases, in the process of forming such trim cover assembly, at first, all the cover materials are sewn together, with their reverse surfaces exposed outwardly, while defining an opening at a given point, so as to provide a reversed state of three-dimensional trim cover assembly, with all its outer surfaces facing inwardly thereof, which has the foregoing opening defined therein. Thereafter, a local part of the outer surfaces disposed inwardly of so reversed trim cover assembly is drawn outwardly through such opening, and then, by completely drawing out all the outer surfaces through that particular opening, a whole of the trim cover assembly is reversed into a normal state where all the outer surfaces thereof show up outwardly. Next, a required headrest frame element having a pair of stays formed therewith is inserted through the opening into the inside of such normal state of trim cover assembly and placed in position therein, while projecting the pair of stays through respective two holes formed in the trim cover assembly to the outside, whereby is provided a basic headrest unit comprising the three-dimensional trim cover assembly and the headrest frame disposed therein, with the pair of stays projecting outwardly from the trim cover assembly.

Such basic headrest unit is then placed in a foaming die device, followed by injecting a liquid foaming agent into the inside of the trim cover assembly. At this step, there has been the problem that the liquid foaming agent is leaked out through the aforementioned opening.

To solve the foregoing problem, the prior invention disclosed in the Japanese Laid-Open Patent, Publication No. 9-11252, which has been assigned to the same assignee of the present invention, teaches a foaming die device provided with a closure element for forcibly causing the afore-said opening to close tight, thereby preventing leakage of a liquid foaming agent through that opening. In brief, according thereto, when the basic headrest unit is placed in the die device, a closure plate element is forcibly inserted in the opening so that both two lateral edges of the opening are stretched outwardly in a direction opposite to each other, whereupon the opening is deformed laterally and brought to close contact with all peripheral surfaces of the plate element. Thus, the opening itself is in a completely closed state to prevent the liquid foaming agent from being leaked out therethrough.

In the foregoing prior art, the foaming die device comprises a stationary die and a movable die, such that the movable die is movable toward and away from the stationary die so as to close and open the die device, thereby allowing a basic headrest unit to be placed between the two dies and allowing a resultant headrest to be taken out therefrom. However, the closure plate element is provided to the movable die, with the result that, after having placed the basic headrest unit in the stationary die, just prior to the movable die being engaged upon the stationary die, it is required on the worker's side to quickly and precisely insert the closure plate element in the foregoing opening in the basic headrest unit. At this step, in most cases, the worker can not easily insert the closure plate element in the opening and can hardly ascertain that the closure plate element is precisely inserted in the opening in a manner sufficient to prevent leakage of liquid foaming agent through the opening.

Additionally, when disengaging the movable die from the stationary die, it is required for the worker to use his or her much more force than usual to forcibly widen the opening and remove the closure plate element therefrom, which has been with the problem that the movable die can not be quickly disengaged from the stationary die.

SUMMARY OF THE INVENTION

In view of the above-stated drawbacks, it is a purpose of the present invention to provide an improved foaming die device which permits a closure element of the above-described type to be easily inserted in the afore-said opening of three-dimensional trim cover assembly placed in the foaming die device, prior to foaming operation, and also to be easily removed from that opening when a resultant foamed product integral with the trim cover assembly is taken out from the foaming die device, subsequent to the foaming operation.

In order to achieve such purpose, a forming die device in accordance with the present invention is basically comprised of:

a die element in which a three-dimensional trim cover assembly having an opening defined therein is to be placed;

an injection means for injecting a liquid foaming agent into an inside of the three-dimensional trim cover assembly, the injection means being capable of connection with the die element and the three-dimensional trim cover assembly, when the three-dimensional trim cover assembly is placed in the die element, thereby allowing the liquid foaming agent to be injected from the injection means into the inside of the three-dimensional trim cover assembly placed in the die element; and a closure element for insertion in the opening to thereby close that particular opening and prevent leakage of the liquid foaming agent therethrough, the closure element being rotatably provided in the die element, such that, when the three-dimensional trim cover assembly is placed in the die element, the closure element is able to be rotated toward and inserted in the opening, whereas, when the three-dimensional trim cover assembly is taken out from the die element, the closure element is able to be rotated and removed from the opening.

As one aspect of the present invention, the afore-said opening may be an elongated opening extending in a direction transversely of the three-dimensional trim cover assembly, wherein such elongated opening has a width, and the closure element may comprise a pair of spaced-apart closure plate pieces having an entire width substantially equal to the width of the elongated opening, or one closure plate having an entire width substantially equal to the width of the elongated opening.

Other features and advantages of the present invention will become apparent from reading of the descriptions hereinafter, with reference to the annexed drawings.

DETAILED DESCRIPTION OF PREFERRED EMBODIMENTS OF THE INVENTION

Referring to FIGS. 1 through 8, there are illustrated preferred embodiments of a foaming die device, as generally designated by (FD), in accordance with the present invention.

Generically stated, the foaming die device (FD) belongs to the previously stated type of foaming die device which allows the aforementioned sort of three-dimensional trim cover assembly having an opening defined therein to be placed therein and allows a liquid foaming agent to be injected into an inside of so placed trim cover assembly, after which, the liquid foaming agent is cured into an increased mass of foam padding filled in the trim cover assembly, thereby forming a foamed product integral with trim cover assembly.

The die device and trim cover assembly to be described are not limitative, but may be formed in any desired manner, insofar as they serves the purpose of forming a foamed product integral with the trim cover assembly. As noted earlier, the term "foamed product integral with trim cover assembly" is a generic term which generically refers to a foam product formed integrally together with a three-dimensional trim cover assembly, which is typically formed through the following known steps of: injecting a liquid foaming agent into the inside of the trim cover assembly preformed in a predetermined shape and placed in a given die means; and then curing the liquid foaming agent into an increased mass of foam material (e.g. foam padding) filled in the trim cover assembly.

Hereinafter, based on the foregoing generic definition, a specific description will be made of a foaming die device (FD) designed to form a headrest with two stays (see the designation (HR) in FIG. 8), by way of one example.

Figure 1:
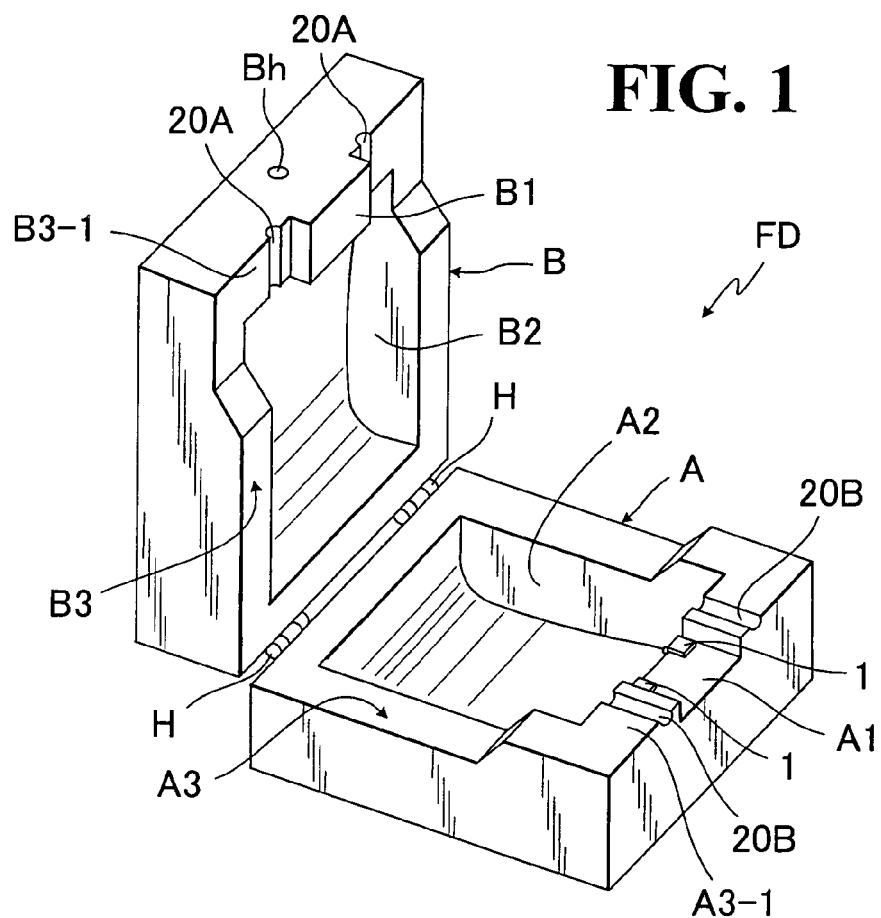
FIG. 1 is a schematic perspective view showing one exemplary mode of foaming die device in accordance with the present invention, which is designed to foam a headrest.
Figure 2:
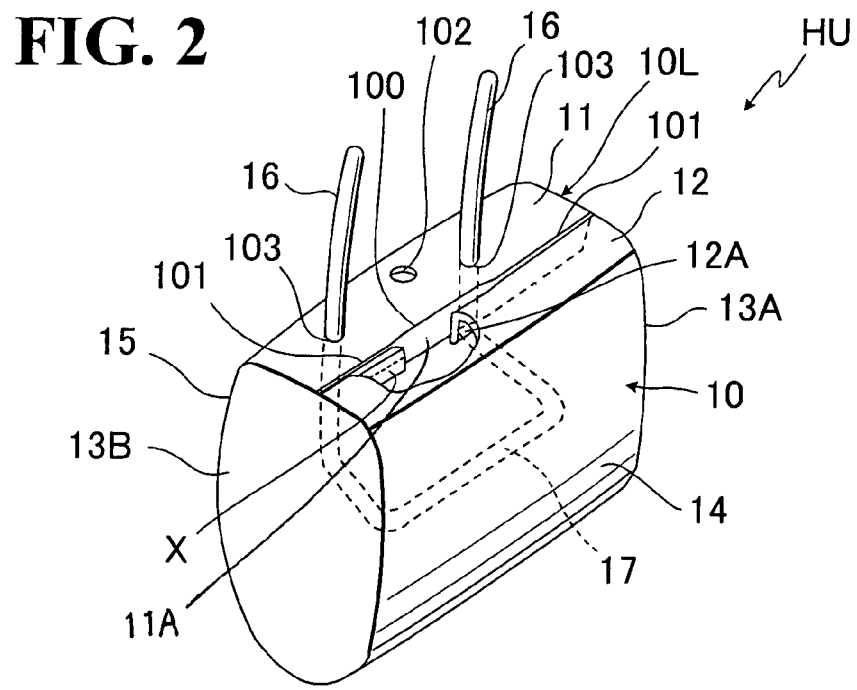
FIG. 2 is a partly broken schematic perspective view of a basic headrest unit to be placed in the foaming die device and to undergo foaming process therein.

FIG. 1 shows, in the perspective, the foaming die device (FD) for forming such headrest (H). FIG. 2 shows, in the perspective, a basic headrest unit (HU) to be placed in the foaming die device (FD) and undergo foaming process therein to form the headrest (H).

As shown in FIG. 2, the basic headrest unit (HU) is basically comprised of: a three-dimensional trim cover assembly (10) preformed in a predetermined shape of headrest body; a frame (17) disposed within the trim cover assembly (10); and a pair of stays (16) (16) integral with the frame (17), which projects outwardly from the trim cover assembly (10).

The basic headrest unit (HU) itself is known in the art, and the first step for forming such headrest unit (HU) is to form the three-dimensional trim cover assembly (10) having a predetermined headrest configuration. Formation of such trim cover assembly (10) is done by sewing a plurality of separate cover materials, as previously explained in the description of prior art, Namely, in the illustrative embodiment, a brief description will be made of how the basic headrest unit (HU) is formed, on the basis of the conventional processes in the foregoing description of prior.

At first, a plurality of separate cover materials to be sewn together comprise: a first cover material (14) corresponding to a frontal surface for receiving a head of user; a second cover material (15) corresponding to a surface opposite to that frontal surface; a pair of lateral cover materials (13A) (13B); a first bottom cover material (11) having an extension (11A); and a second bottom cover material (12) having an extension (12A). All those cover materials are sewn together, with their respective reverse surfaces exposed outwardly, so as to provide a reversed state of trim cover assembly (10) in such a configuration as understandable from FIG. 2.

It is noted here that, in the bottom side (10L) of trim cover assembly (10), the two extensions (11A) (12A) respectively of the first and second bottom cover materials (11) (12) are bent and contacted with each other along a rectilinear line, hence naturally defining a rectilinearly elongated opening (at L) along and between those two extensions (11A) (12A) in a direction transversely of the bottom side (10L). As can be seen from FIGS. 5 and 6, the two extensions (11A) (12A) are sewn together, as indicated by the two spaced-apart seam portions (X) (X), so that the corresponding two spaced-apart local opening regions of opening (L) are each closed, thus defining a pair of closed opening portions (101) (101) and a predetermined elongated opening (100) therebetween in the bottom side (10L) of trim cover assembly (10), wherein the elongated opening (100) has a predetermined width (W).

Designation (102) denotes an injection hole formed in the first bottom cover material (11), which is adapted for allowing an injection nozzle (not shown) to be inserted therethrough for injecting a liquid foaming agent (not shown) into the inside of the trim cover assembly (10), which is well known in the art and will not be described any more.

At this point, in the reversed state of trim cover assembly (10), the two extensions (11A) (12A) are bent outwardly of the trim cover assembly (10), through not shown.

Then, a local part of the outer surfaces disposed inwardly of so reversed trim cover assembly (10) is drawn outwardly through the afore-said opening (100), and, by completely drawing out all the outer surfaces through that particular opening (100), a whole of the trim cover assembly (10) is reversed into a normal state, as shown in FIG. 2, wherein all the outer surfaces thereof show up outwardly and both two extensions (11A) (12A) project inwardly of the trim cover assembly (10).

Thereafter, a whole of the frame (17) together with the two stays (16) is inserted through that opening (100) into the inside of trim cover assembly (10), after which, the two stays (16) are only drawn out through the respective two holes (103) (103) and projected outside of the trim cover assembly (10), whereupon a basic headrest unit (HU) is formed as shown in FIG. 2.

In accordance with the present invention, as best seen in FIG. 1, a foaming die device (FD) is provided, by which the above-described basic headrest unit (HU) can easily be placed therein, with the afore-said opening (100) completely closed, for subsequent foaming operation, and also, after the foaming operation, a resultant headrest can easily be taken out therefrom.

Namely, the foaming die device (FD) is basically comprised of: a stationary lower die (A) having a recessed working die surface (A2) and a recessed flat region (A1); a pair of spaced-apart closure plate pieces (1) (1) rotatably secured on the recessed flat region (A1); and a movable upper die (B) having a recessed working die surface (B2) and a protrudent engagement portion (B1).

Figure 7:
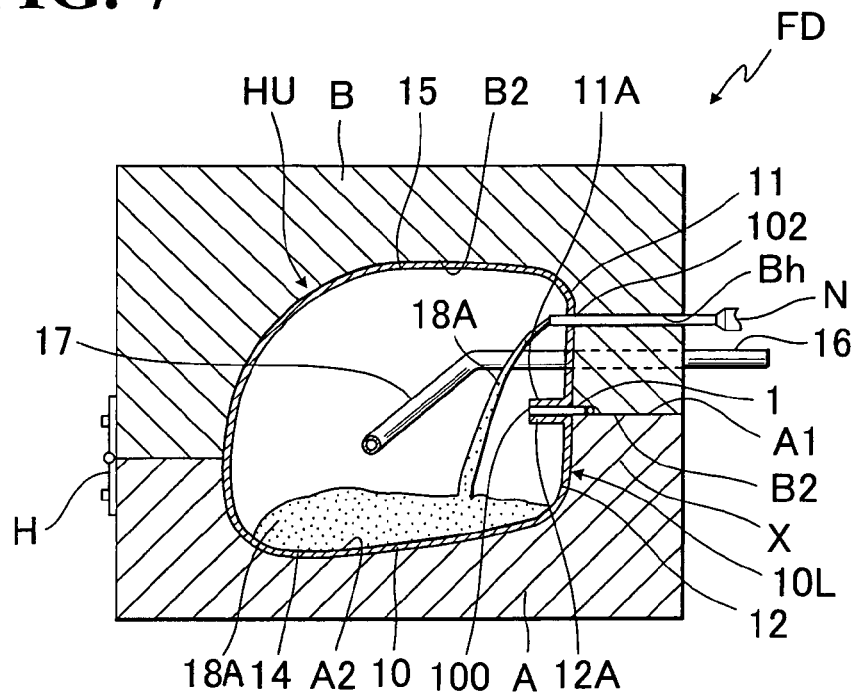
FIG. 7 is a partly broken sectional view for explanatorily showing the state where the trim cover assembly is placed in the foaming die device and a liquid foaming agent is injected into the inside of the trim cover assembly.

More specifically, with regard to the stationary lower die (A), as understandable from FIGS. 1 and 7, the recessed working die surface (A2) thereof is formed centrally of the stationary lower die (A), with a peripheral flat surface (A3) surrounding that recessed working die surface (A2). The recessed working die surface (A2) per se is of a predetermined configuration for allowing a substantially one half of the trim cover assembly (10) to be placed therein. The recessed flat region (A1) is formed in one localized area (A3-1) of the peripheral flat surface (A3), as shown in FIG. 1. Designations (20B) and (20B) denote two semi-circular support grooves, respectively, which are formed in that one local region (A3-1) on the opposite sides of the recessed flat region (A1).

On the other hand, as shown, the movable upper die (B) is rotatably connected via hinges (H) with the stationary lower die (A) so as to be movable toward and away from the latter. As understandable from FIGS. 1 and 7, the recessed working die surface (B2) is formed in and centrally of the upper die (B), with a peripheral flat surface (B3) surrounding that recessed working die surface (B2), and the recessed working die surface (B2) per se is of a predetermined configuration for allowing a substantially another half of the trim cover assembly (10) to be placed therein. The protrudent engagement portion (B1) is formed in one localized area (A3-1) of the peripheral flat surface (A3), as shown in FIG. 1. This protrudent engagement portion (B1) is substantially equal to or slightly smaller than the foregoing recessed flat region (A1) in sizes, so that the former (B1) can be fit engaged in the latter (A1) and disengaged therefrom smoothly.

Designations (20A) and (20A) denote two semi-circular support grooves, respectively, which are formed in that one local region (B3-1) on the opposite sides of the recessed flat region. (B1) in correspondence with the respective two semi-circular support grooves (20B) (20B) of the lower die (A).

In accordance with the present invention, it is important to note that the afore-said recessed flat region (A1) is situated substantially at a given level for alignment with the elongated opening (100) of the trim cover assembly (10) placed in the recessed working die surface (A2) of stationary lower die (A).

Figure 3:
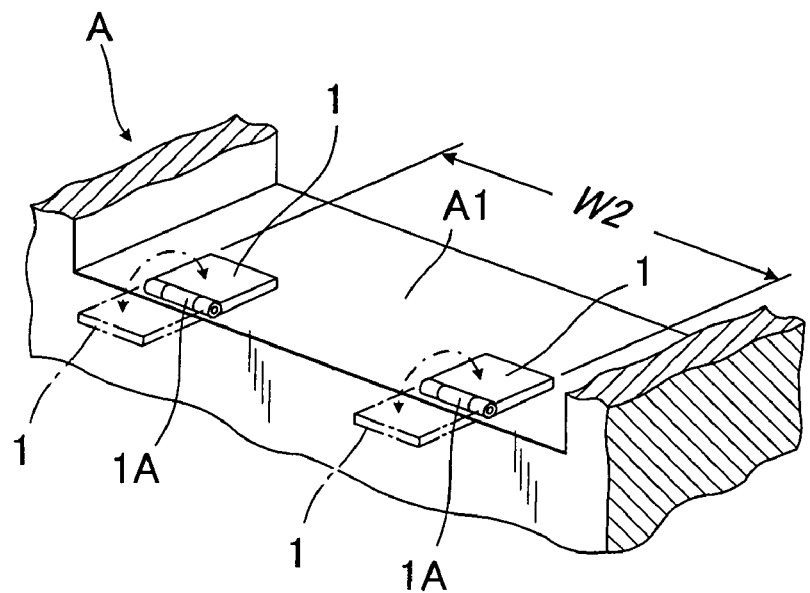
FIG. 3 is a partly broken schematic perspective view showing a pair of closure plate pieces by way of one example.

Also, in the present invention, rotatably secured via a hinge (1A) on that recessed flat region (A1) are the previously stated pair of spaced-apart closure plate pieces (1) (1) which has an entire width (W2) equal to the foregoing width (W) of the elongated opening (100). As best shown in FIG. 3, the two closure plate pieces (1) (1) are free to rotate about their respective hinges (1A) by 180 degrees with respect to a horizontal plane of the flat reference region (A1).

In operation, at first, the basic headrest unit (HU) is brought to the-stationary lower die (A), such that the frontal side thereof (at 14) faces the working die surface (A2) of the latter, while the bottom side (at 10L) thereof faces the recessed flat region (A1). Then, about one half of the trim cover assembly (10), inclusive of the cover materials (14) and (12), is placed in the working die surface (A2), so that one half of each of the two stays (16), which projects from the bottom side (10L) of the trim cover assembly (10), is received in each of the two semi-circular support grooves (20B), and the elongated opening (100) defined in that bottom side (10L) is substantially in alignment with the horizontal plane of recessed local flat region (A1).

Figure 5:
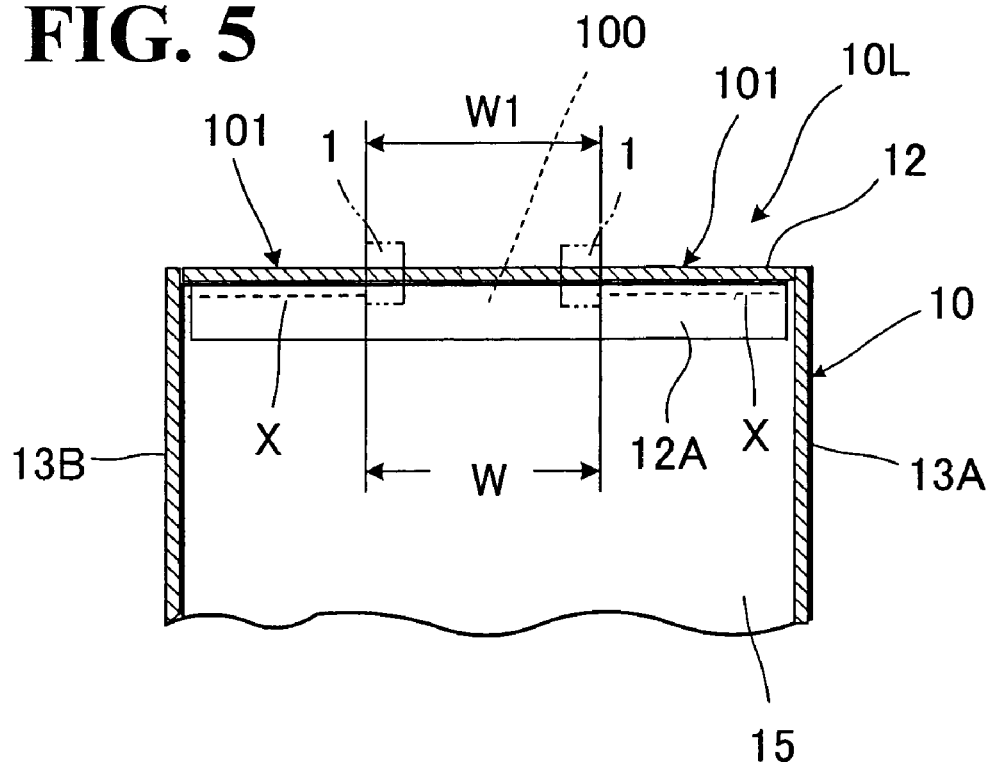
FIG. 5 is a fragmentary sectional view showing an elongated opening of trim cover assembly, in which the foregoing pair of closure plate pieces are to be inserted.
Figure 6:
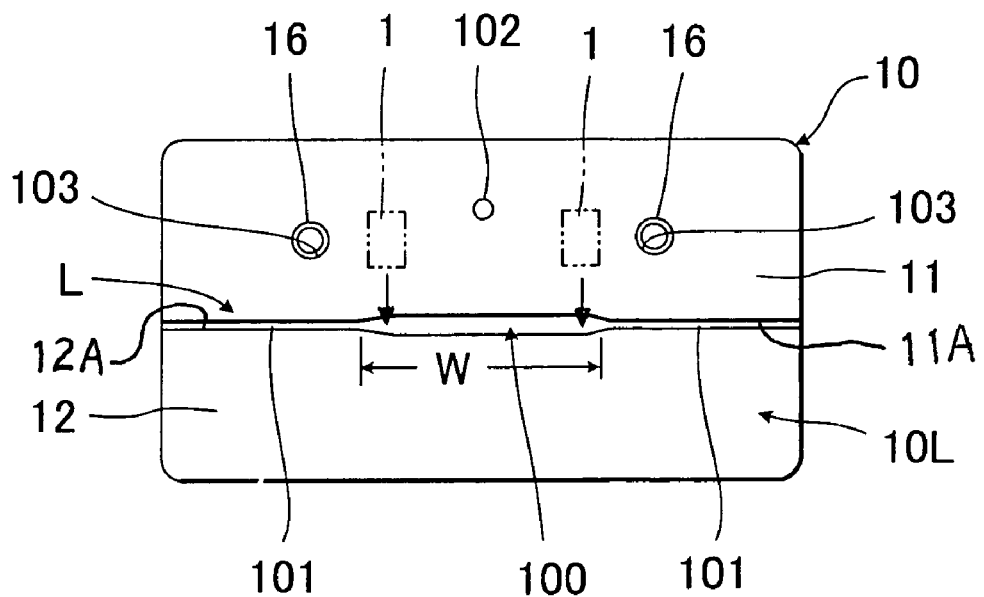
FIG. 6 is a bottom view of the trim cover assembly where such elongated opening lies, which indicates how the pair of closure plate pieces are inserted in that particular elongated opening.

At this point, both two closure plate pieces (1) has been placed on that recessed flat region (A1) as shown in FIG. 3. Those two closure plate pieces (1) are now rotated about their respective hinges (1A) by 180 degrees toward the elongated opening (100) and forcibly inserted therein, as roughly indicated by the two arrows in FIG. 6 and as can be seen in FIG. 5, so that the elongated opening (100) is stretched laterally along the longitudinal direction of the line (L) and closed tight.

The movable upper die (B) is rotated about the hinge (H) downwardly and engaged upon the stationary lower die (A), so that about another half of the trim cover assembly (10), inclusive of the cover materials (15) and (11), is enclosed by the working die surface (B2), and at the same time, the protrudent engagement portion (B1) of the upper die (B) is fit engaged in the recessed flat region (A1) of the lower die (A), while another half of each of the two stays (16) is received in each of the two semi-circular support grooves (20A), Thereafter, as shown in FIG. 7, an injection nozzle (N) is inserted through the through-hole (Bh) of the upper die (B) as well as the injection hole (11) of trim cover assembly (10), and a predetermined amount of liquid foaming agent (18A) is injected from the injection nozzle (N) into the inside of the trim cover assembly (10). Then, the liquid foaming agent (18A) is cured and transformed into an increased mass of foam padding (18) filled in the trim cover assembly (10), as understandable from FIG. 8. During that foaming operation, the liquid foaming agent (18A) is prevented from being leaked through the elongated opening (100) which is completely closed by the two closure plate pieces (1) as described above. Accordingly, a foamed product integral with trim cover assembly, or a resultant headrest (HR) comprising the foam padding (18) and the trim cover assembly (10) integral with the foam padding (18) and two stays (16), is produced in the foaming die device (FD), which can be understood from FIG. 8 in conjunction with FIG. 7.

Figure 8:
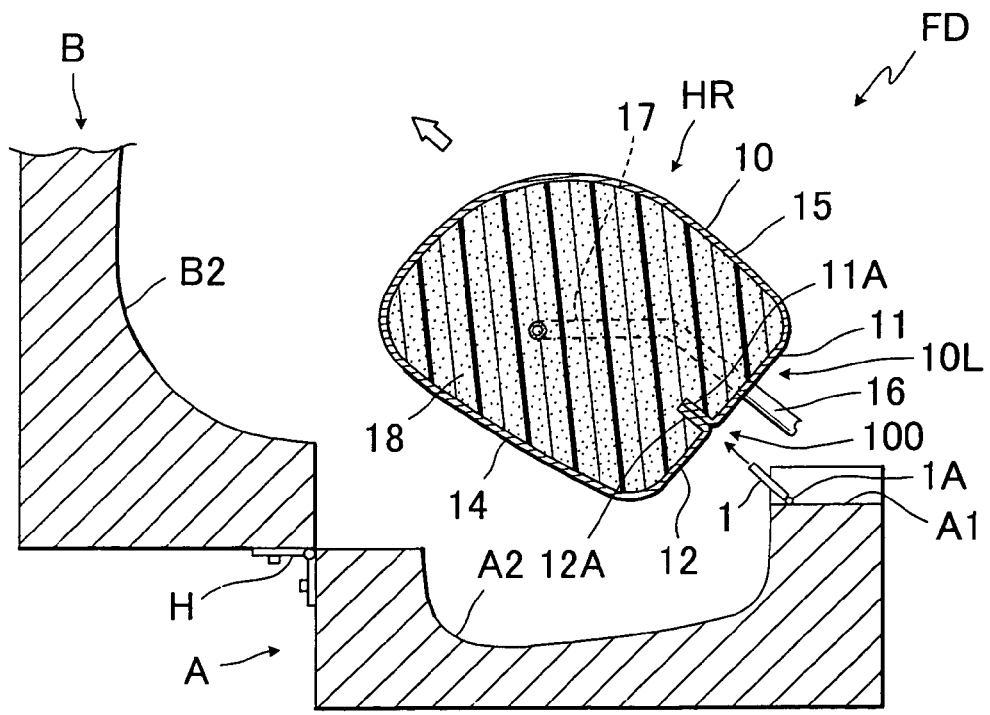
FIG. 8 is a partly broken sectional view for explanatorily showing how a resultant headrest is taken out from the foaming die.

After the completion of the above-explained foaming operation, as clearly indicated in FIG. 8, the movable upper die (B) is rotated upwardly away from the stationary lower die (A), and then, the resultant headrest (HR) is taken out from the stationary lower die (A). At this moment, as indicated by the arrows in FIG. 8, the headrest (HR) itself is naturally inclined upwardly by a worker, which in turn causes both two closure plate pieces (1) to rotate and incline in the likewise upward direction. Hence, as the headrest (HR) is moved away from the lower die (A), those two closure plate pieces (1) are smoothly and quickly removed from the elongated opening (100), without necessity on the worker's side to take care thereabout.

Figure 4:
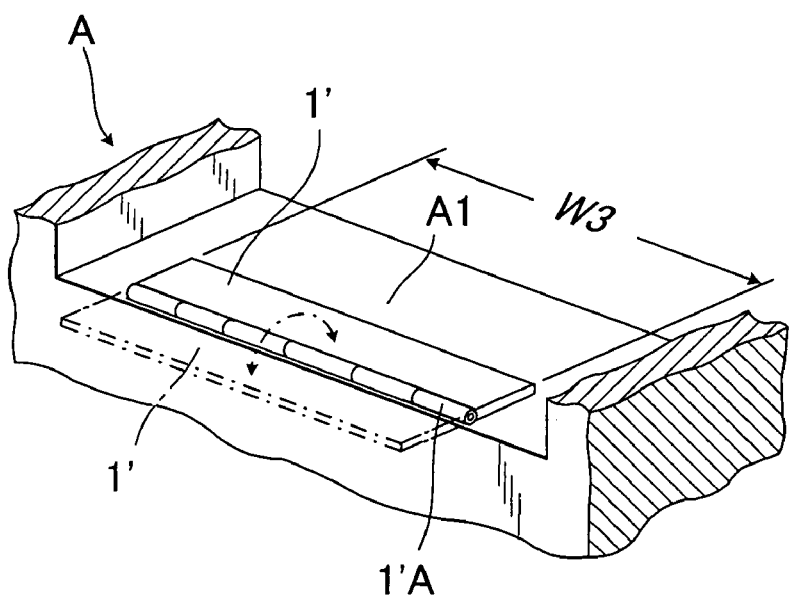
FIG. 4 is a partly broken schematic perspective view showing one closure plate by way of another example.

As suggested in FIG. 4, in place of the two closure plate pieces (1), one piece of closure plate (1') may be used. Namely, in this particular embodiment, one unitary closure plate (1') having a width (W3) substantially equal to the width (W) of the elongated opening (100) is rotatably secured via a hinge (1'A) on the recessed flat region (A1) Briefly stated, in the same manner as previously described, the unitary closure plate (1') will be inserted in the elongated opening (100) to prevent leakage of liquid foaming agent therefrom, when the basic headrest unit (HU) is placed in the stationary lower die (A), and, subsequent to the previously described foaming operation, when a resultant headrest (at HR) is inclined upwardly and taken from the lower die (A), the unitary closure plate (1') will be inclined in the likewise upward direction relative to the hinge (1'A) and smoothly removed from that elongated opening (100). Any person skilled in the art can readily understand such detailed operations and advantages, through not shown in the drawings.

While having described the present invention thus far, it should be understood that the invention is not limited to the illustrated embodiments, but any other modification, replacement, and addition may be applied thereto without departing from the scopes of the appended claims.

What is claimed is:

1. A foaming die device in which a three-dimensional trim cover assembly having an opening defined in one side thereof is placed for application of a foaming process together with a liquid foaming agent, said foaming die device comprising:

a stationary die having an inner die surface;

a movable die having an inner die surface, said movable die movable into engagement with said stationary die to define a foaming space between said inner die surface of said stationary die and said inner die surface of said movable die;

said stationary die having an inner region adjacent to the inner die surface, wherein said inner region faces said one side of said three-dimensional trim cover assembly when the three-dimensional trim cover assembly is placed in said foaming space;

an injection element for injecting said foaming agent into an inside of said three-dimensional trim cover assembly, said injection element engageable with said foaming die device and said three-dimensional trim cover assembly when the three-dimensional trim cover assembly is placed in said foaming space subsequent to said movable die being engaged with said stationary die, thereby allowing said liquid foaming agent to be injected from said injection element into said inside of the three-dimensional trim cover assembly;

a closure element for insertion into said opening of said three-dimensional trim cover assembly to close said opening and prevent leakage of said liquid foaming agent therethrough, said closure element being rotatably provided in said inner region of said stationary die substantially at a point for alignment with said opening when the three-dimensional trim cover assembly is placed in said inner die surface of said stationary die, with such an arrangement that the closure element is rotatable relative to said point at said inner region of the stationary die, thereby allowing the closure element not only to be directly inserted into said opening prior to said three-dimensional trim cover assembly being placed in said inner die surface of said stationary die, but also readily removable from the opening when the three-dimensional trim cover assembly is removed from the foaming die device subsequent to said foaming process.

2. The foaming die device as claimed in claim 1, wherein said opening is an elongated opening extending in a direction transversely of said three-dimensional trim cover assembly, wherein said elongated opening has a width, and wherein said closure element comprises a pair of spaced-apart closure plate pieces which have an entire width substantially equal to said width of said elongated opening.

3. The foaming die device as claimed in claim 1, wherein said opening is an elongated opening extending in a direction transversely of said three-dimensional trim cover assembly, wherein said elongated opening has a width, and wherein said closure element comprises one closure plate having an entire width substantially equal to said width of said elongated opening.

* * * * *